United States Patent [19]
Fuller et al.

[11] 3,779,723
[45] Dec. 18, 1973

[54] THIXOTROPIC COMPOSITIONS

[75] Inventors: Glenn Fuller; Alfred John Lawrence Toombs, both of Berkeley, Calif.

[73] Assignee: Shell Oil Company, New York, N.Y.

[22] Filed: Aug. 15, 1963

[21] Appl. No.: 302,444

[52] U.S. Cl.................. 44/7 C, 149/22, 149/44, 149/87
[51] Int. Cl................................. C10l 7/02
[58] Field of Search ...149/37–44, 87, 29, 22; 44/7 C

[56] References Cited
UNITED STATES PATENTS

| | | |
|---|---|---|
| 2,890,108 | 6/1959 | Toulmin............................ 149/87 X |
| 2,960,394 | 11/1960 | Schrieber et al.................. 149/87 X |
| 3,019,145 | 1/1962 | Whitby................................ 149/87 |
| 3,092,959 | 6/1963 | Scurlock et al................... 149/44 X |

*Primary Examiner*—Benjamin R. Padgett
*Attorney*—George G. Pritzker

[57] ABSTRACT

Stable dispersions or suspensions of solid metal or metal hydride particles or powders in liquid hydrocarbons in mobile thixotropic suspensions are prepared by mixing metals and their hydrides into hydrocarbon slurries with a gellant of a monoester of a $C_{4-18}$ hydrocarbyl mercapto methyl phosphonic acid.

14 Claims, No Drawings

THIXOTROPIC COMPOSITIONS

This invention relates to new and novel thixotropic hydrocarbon compositions containing dispersed therein finely divided metals and hydrides thereof and to methods of forming said thixotropic compositions. More particularly, the present invention pertains to gelling in situ liquid hydrocarbons containing combustible solids, e.g., metal or metal hydride particles by means of a novel additive of the present invention.

It is known that certain finely divided metals such as beryllium, boron, magnesium, aluminum and their hydrides when stably suspended in liquid hydrocarbons provide high energy fuels for air breathing applications. Also, such metal and metal hydride suspensions in hydrocarbons when used with certain oxidizers such as hydrogen peroxide, function as storable high energy fuels in high energy liquid bi-propellant systems. However, the problem of keeping these metals stably suspended in the liquid carrier is a difficult one and the use of various suspending agents such as soaps or thickeners such as organic polymers, e.g., polyvinyl chloride has proved to be ineffective, particularly when the suspension has to be maintained for long periods of time.

It is an object of the present invention to provide improved dispersion of metals and their hydrides and the like. It is a particular object of the invention to provide dispersions which are in the form of mobile slurries or gels having thixotropic properties and possessing good low viscosity and good pumpability properties. Another object is to provide novel metal dispersions having thixotropic properties which are resistant to settling, and have uniform properties over a wide temperature range. Still further objects include the provision of novel suspensions of metals and their hydrides ideally suited as fuels or additives for fuels for ramjet and turbo-jet engines, and bipropellants for missiles, rockets, flame throwers, and the like. Other objects will become apparent from the discussion hereinafter.

Now in accordance with this invention, novel stable dispersions or suspensions of solid metal or metal hydride particles or powders in liquid hydrocarbons in mobile thixotropic suspension can be accomplished by admixing into hydrocarbon slurries containing metals, e.g., trivalent metals and their hydrides, from about 0.01 percent to about 10 percent, preferably from about 0.1 percent to about 5 percent by weight of a monoester of a $C_{4-18}$ hydrocarbyl mercapto methyl phosphonic acid having the formula:

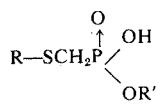

where R is a $C_{4-18}$ hydrocarbyl radical, e.g., $C_{4-18}$ alkyl radical and R' is a $C_{1-18}$ alkyl radical, e.g., methyl or butyl radical or the like.

These esters can be prepared by reacting an alkali metal mercaptide with a diester of chloromethyl phosophonic acid and hydrolyzing with a base one of the ester groups. Thus, for example, monobutyl 2-thiadodecyl-phosphonate was prepared as follows:

In a 5-liter three neck flask equipped with stirrer, dropping funnel and condenser was placed 435 g (2.5 moles) of n-decyl mercaptan, 174 g of 85 percent potassium hydroxide pellets (2.6 moles pure KOH) and 1,375 ml of ethanol. The mixture was stirred until all the pellets had dissolved, at which time 606 g (2.5 moles) of dibutylchloromethyl phosphonate was added slowly through the dropping funnel. Addition took about 3 hours as the reaction was quite exothermic. The heat was turned on and the system allowed to reflux for 20 hours. The mixture was cooled and water added until two phases separated. The organic phase was removed, the aqueous phase was extracted with 2 × 300 ml of ether and the extracts were added to the organic phase. The combined ether solution was dried over anhydrous magnesium sulfate and the ether was removed by distillation. Unreacted dibutylchloromethyl phosphonate was removed by stripping to a kettle temperature of 165°C at 1 mm. The yield of bottoms product was 708 g (75 percent).

A mixture of 190 g (0.5 mole) of dibutyl 2-thiadodecyl-phosphonate and 38 g (5 percent excess) of KOH pellets in 500 ml of ethanol was refluxed for 22 hours. The mixture was cooled and diluted with water until a slight organic phase (unreacted dibutyl ester) formed. The organic phase was removed and the aqueous phase was extracted once with 300 ml of ether. The extract was discarded. The aqueous solution was then acidified with dilute hydrochloric acid. An organic (product) phase formed. This was removed by extraction with 300 ml of ether. The combined ether extracts were stripped first on house vacuum, then at 160°C and 3.5 mm of mercury to give 108.5 g (67 percent of monobutyl ester.

The monoester of hydrocarbyl mercapto methyl phosphonic acid can also be prepared by esterifying with a $C_{1-4}$ alkanol, e.g., methanol or butanol, hydrocarbyl mercapto methyl phosphonic acid.

Another method of making the mercaptomethylphosphonates is to react a suitable mercapto compound, such as an alkali metal, e.g., Na or K, $C_{4-18}$ alkyl mercaptide with an alkali metal, e.g., Na or K, salt of chloromethylphosphonic acid in an alcoholic solution under reflux conditions and under an inert atmosphere to form the alkali metal salt of an alkyl mercaptomethylphosphonic acid. The salt is then treated with a strong acid such as hydrochloric acid to spring free the alkylmercaptomethylphosphonic acid, which can be converted into the desired monoester.

The following monoesters are illustrative examples of gelling agents for metal powders suspended in liquid hydrocarbon carriers: monobutyl 2-thiadodecylphosphonate, monobutyl 2-thiatetrodecyl-phosphonate, monomethyl 2-thiadodecylphosphonate, monoethyl 2thiatetradecylphosphonate, monobutyl cyclohexylmercaptomethyl phosphonate, monobutyl benzylmercaptomethyl phosphonate; and mixtures thereof.

The high energy metal powders and their hydrides effectively gelled by the additives of this invention include beryllium, boron, magnesium, aluminum, and/or titanium and the like. It is preferred that the particles of the powders be less than 200 microns in diameter and preferably between 1.0 and 10.p microns on average. Mixtures of the metals may be used and di- or trimodal mixtures of particle sizes may be employed for the purpose of providing more stable suspensions and suspensions having special properties.

It is desirable to provide thixotropic compositions containing the maximum amount of particulate combustible solids possible. Thus, it may be desirable to include auxiliary agents such as viscosity modifiers, wetting agents, and suspending agents for the purpose of facilitating mobility and pumpability and maintaining the solid in thixotropic state while at the same time maximum solids content is achieved. A number of classes of dispersing agents are useful for this purpose such as:

1. Hydrocarbon-soluble hydrolyzed copolymers of $C_{12-30}$ straight-chain alpha olefins with 0.5-5 mol (per mol of olefin) of a vinyl ester, e.g., vinyl formate, vinyl acetate, vinyl butyrate or vinyl benzoate, mol wt 4,000–15,000. An example of such a copolymer is a 95 percent hydroxyzed copolymer of $C_{18-18}$ alpha olefin and vinyl acetate (1/5 mol ratio) having a molecular weight of about 27,000.
2. Copolymers of (a) a mono-vinyl substituted pyridine, (b) lauryl and stearyl methacrylate in a mol ratio between 1:4 and 4:1 and (c) a $C_{1-4}$ alkyl acrylate, mol wt $5 \times 10^4$ to $2.5 \times 10^6$. An example of such a copolymer is a copolymer of 2.52 mol of stearyl methacrylate, 5.04 mol of lauryl methacrylate, 0.83 mol of methyl methacrylate and 1 mol of 2-methyl-5-vinylpyridine.
3. Sorbitan, glycol sorbitan, and polyoxyethylene sorbitan esters of $C_{14-18}$ fatty acids.
4. Polyoxyethylene esters of $C_{12-18}$ fatty acids.
5. High mol wt fatty acids, esters or $C_{6-16}$ fatty alcohols. Specific examples include: glycol sorbitan laurate, polyoxyethylene sorbitan distearate, polyoxyethylene stearate, hexadecyl alcohol.

The thixotropic compositions of the present invention contain substantial amounts (90–25 percent by weight) of combustible solids, suspending proportions preferably 10–75 percent of a normally liquid hydrocarbon and 0.01–10 percent by weight of a monophosphonate ester or derivative thereof as specified providing thixotropic properties to the thickened compositions. Effective dispersing amounts of dispersion agents or viscosity modifiers as described above will vary from one composition to another, depending upon the specific dispersing agent and viscosity modifier and the specific solids used.

The normally liquid hydrocarbon in which the combustible solids are suspended may be one or a mixture of hydrocarbons ranging from light liquid hydrocarbons such as the gasolines through lubricating oils. For use in ramjets and the like, it is preferred that fuels normally employed for jet propulsion be utilized. These are normally special hydrocarbons, hexane, heptane, diethylcyclohexane, cyclohexane or petroleum cuts in the kerosene boiling range but may include gas oils or higher boiling gasolines as well. Still higher volumetric thermal value is obtained by utilizing as the suspending fluid highly saturated naphthenic materials such as decalins and alkylated decalins wherein the alkyl radicals have from one to four carbon atoms each. These may be modified by the presence of polycyclic hydrocarbons, preferably saturated, such as dimethanodecalins.

The following examples illustrate compositions according to the present invention.

EXAMPLE I

A kettle equipped with a high speed stirrer was used in the preparation of the following composition. 70 parts by weight of amorphous boron having an average particle size of about 1 micron diameter was dispersed by means of high speed stirring in 30 parts by weight of jet fuel meeting JP-4 jet fuel specifications to which was added 0.5 percent of the monobutyl 2-thiadodecyl phosphonate.

EXAMPLE II

A similar composition was prepared by dispersing propellant grade aluminum powder in JP-4 jet hydrocarbon fuel, the thixotropic suspending agent being monobutyl 2-thiadodecyl phosphonate.

EXAMPLE III

Boron powder having an average particle size of about 2 microns diameter was dispersed in diethylcyclohexane, the thixotropic suspending agent being the monoethyl 2-thiadodecyl phosphonate. The compositions contained 1 percent by weight of the phosphonate based on the hydrocarbon, 60 percent of diethyl cyclohexane and 40 percent by weight of boron.

EXAMPLE IV

High energy fuel compositions are provided by the combination of 70 percent aluminum, 0.1–1.0 percent of monobutyl 2-thianonyl phosphonate suspended in 29 percent by weight of a mixture of decalins.

EXAMPLE V 70 percent aluminum powder in 30 percent diethyl cyclohexane when admixed formed a slurry having a consistency of wet sand. Addition of 0.2 percent of monobutyl 2-thiadecyl phosphonate formed a thixotropic suspension which was mobile and easily pumpable. Viscosity/shear data on this suspension was obtained as follows:

| Shear Rate ($sec^{-1}$) | Apparent Viscosity (Poises) |
| --- | --- |
| 5 | 250 |
| 100 | 40 |
| 1000 | 1.6 |

EXAMPLE VI

A thixotropic propellant composition was provided by suspending 15 percent aluminum and 65 percent ammonium perchlorate in 20 percent of kerosene hydrocarbons, the dispersion being aided by the presence of 1 percent by weight of a copolymer of 2-methyl-5-vinylpyridine, stearyl methacrylate and lauryl methacrylate in 1:5:2.5 mol ratio having an average molecular weight of about 800,000. The thixotropic gelling agent for this composition is 0.1–0.5 percent by weight of monobutyl 2-thiaoctadecyl phosphonate based on the hydrocarbon.

The addition of 2 percent of monobutyl 2-thiadodecyl phosphonate to diethyl cyclohexane containing 70 percent of aluminum or boron formed a solid gel capable of withstanding temperatures of 350°F without change in structure or stability of the gel.

The monoesters of hydrocarbyl mercaptomethyl phosphonic acid and their derivatives as described can be used to gel hydrocarbon oils such as natural and synthetic hydrocarbon oils including gasoline, kerosene, gas oil, burner fuel oil, lubricating oil containing metal powders for use in various industrial applications such as lubricants for the drawing of metals, gear lubricants, greases and many other applications.

We claim as our invention:

1. A thixotropic composition consisting essentially of a mixture of finely divided particles selected from the group consisting of metal particles and metal hydride particles in a liquid hydrocarbon, gelled, by addition thereto of from about 0.01 percent to about 10 percent of a monoester of a hydrocarbyl mercaptomethyl phosphonic acid and a $C_{1-18}$ alkanol.

2. A thixotropic composition consisting essentially of a mixture of finely divided metal particles and a liquid hydrocarbon, gelled by addition thereto of from about 0.01 percent to about 10 percent of a monoester of $C_{4-18}$ alkyl mercaptomethyl phosphonic acid and a $C_{1-18}$ alkanol.

3. A thixotropic composition consisting essentially of a mixture of finely divided metal particles selected from the group consisting of boron, beryllium, magnesium, aluminum, titanium, boron carbide and aluminumboride in a liquid hydrocarbon, gelled by addition thereto of from about 0.01 percent to about 10 percent of a monoester of $C_{4-18}$ alkyl mercaptomethyl phosphonic acid and a $C_{1-18}$ alkanol.

4. A thixotropic composition consisting essentially of a mixture of boron powder and a liquid hydrocarbon, gelled by addition thereto of from about 0.1 percent to about 5 percent of monobutyl 2-thiadodecyl phosphonate.

5. A thixotropic composition consisting essentially of a mixture of aluminum powder and a liquid hydrocarbon, gelled by addition thereto of from about 0.1 percent to about 5 percent of monobutyl 2-thiadodecyl phosphonate.

6. A thixotropic composition consisting essentially of a mixture of decaborane and a liquid hydrocarbon fuel, gelled by addition thereto of from about 0.1 percent to about 5 percent of monobutyl 2-thiadodecyl phosphonate.

7. A thixotropic composition consisting essentially of a mixture of aluminum hydride powder and a liquid hydrocarbon fuel, gelled by addition thereto of from about 0.1 percent to about 5 percent by weight of monobutyl 2-thiadodecyl phosphonate.

8. A thixotropic composition consisting essentially of a mixture of beryllium hydride powder and a liquid hydrocarbon fuel, gelled by addition thereto of from about 0.1 percent to about 5 percent of monobutyl 2-thiadodecyl phosphonate.

9. A thixotropic composition consisting essentially of a mixture of 5–80 percent of boron powder and the balance being liquid hydrocarbon fuel, gelled by addition thereto of from 0.1–5 percent by weight of monobutyl 2-thiadodecyl phosphonate.

10. A thixotropic composition consisting essentially of a mixture of 5–80 percent of aluminum powder and the balance being liquid hydrocarbon fuel, gelled by addition thereto of from 0.1–5 percent by weight of monobutyl 2-thiadodecyl phosphonate.

11. A thixotropic composition consisting essentially of a mixture of 5–80 percent of aluminum hydride powder and the balance being liquid hydrocarbon fuel, gelled by addition thereto of from 0.1–5 percent by weight of monobutyl 2-thiadodecyl phosphonate.

12. A thixotropic composition consisting essentially of a mixture of 5–80 percent of beryllium hydride powder and the balance being liquid hydrocarbon fuel, gelled by addition thereto of from 0.1–5 percent by weight of monobutyl 2-thiadodecyl phosphonate.

13. The composition of claim 8 containing a minor amount of a dispersing agent.

14. The composition of claim 9 containing a minor amount of a dispersing agent.

* * * * *